United States Patent [19]
Lacan et al.

[11] 3,858,155
[45] Dec. 31, 1974

[54] SYSTEM PROVIDING POWER SUPPLY CONNECTIONS AND INTERCONNECTIONS FOR LOGIC BLOCKS

[75] Inventors: Guy Henri Lacan, Carrieres Sous Bois; Andre Lucien Haury, Le Raincy, both of France

[73] Assignee: La Telemecanique Electrique, Nanterre, France

[22] Filed: Apr. 4, 1973

[21] Appl. No.: 347,628

[30] Foreign Application Priority Data
Apr. 4, 1972 France ............................. 72.11719

[52] U.S. Cl. ...... 339/22 R, 317/101 DH, 339/91 R, 339/176 MP
[51] Int. Cl. ............................................ H01r 13/54
[58] Field of Search ................................ 339/20–22, 339/75, 91, 17, 19, 176, 198; 317/101 DH

[56] References Cited
UNITED STATES PATENTS

| | | | |
|---|---|---|---|
| 2,829,317 | 4/1958 | Timmermans | 339/91 R |
| 3,061,810 | 10/1962 | Boyd | 339/22 R |
| 3,605,064 | 9/1971 | Routh et al. | 339/20 |
| 3,613,045 | 10/1971 | Routh | 339/21 R |
| 3,651,443 | 3/1972 | Quilez | 339/91 R |

*Primary Examiner*—Joseph H. McGlynn
*Attorney, Agent, or Firm*—Karl W. Flocks

[57] ABSTRACT

The power supply leads are arranged in parallel in an insulating block and a rail on which a socket is fastened, having connecting means at its back, whereas its front side is adapted to accommodate a logic block and to transfer the information signals to the vicinity of said logic block.

Applicable in particular in cyclically operating electronic, electro-optical or pneumatic control devices for industrial automation.

4 Claims, 4 Drawing Figures

SYSTEM PROVIDING POWER SUPPLY CONNECTIONS AND INTERCONNECTIONS FOR LOGIC BLOCKS

This invention relates to a system providing power supply connections to logic blocks and the interconnections of these by way of support means supporting these logic blocks, their supply circuits arranged in parallel and interconnecting means.

Such a system is employed in industrial control equipment, particularly in cyclically operating equipment for automation, where information processing is performed by electronic, electro-optical or pneumatic circuits.

There are known power supply and interconnect systems particularly for electronic circuits circuits in which the interconnections are achieved by means similar to those described above.

In these known devices a special support destined for the power supply circuits is arranged on each socket, and, subsequently, this socket can only receive logic blocks of one well determined variety, all other elements being excluded; on the other hand, the leads carrying information and consisting of conducting strips on a printed circuit board are only accessible at the back of the socket so that a modification of the interconnect wiring between the blocks becomes difficult.

In other known devices the logic blocks are arranged in an easily removable way, but all connecting leads for information and supply of power, which are provided in the form of plugs, are located at the front so that the access to the wiring is hampered by a thick layer of conductors crossing over one another and leading to an unsatisfactory arrangement. Moreover, by bringing to the front all connecting plugs, the transversal dimensions of the blocks carrying these plugs become excessive, which entails a considerable incraese of the length of the interconnect wiring and of the surface required for accommodating, side by side, these logic blocks. Finally, no step has so far been taken to ensure that the assembly of logic blocks with other devices such as relays or terminals may be achieved more conveniently.

According to the present invention there is provided a power supply and interconnect system employing a socket of particular shape, allowing to receive power from power supply sources at its back surface and to arrange on the front side merely elements transferring or processing information, and this in order to reduce the dimensions and the length of the connecting leads, making the latter less sensitive as regards noise pick-up and stray coupling.

Another object of the present invention is to employ means for fixing the sockets that ensure retaining and protecting the power supply leads on the one hand, allowing on the other hand to attach control devices associated with the logic blocks.

According to the present invention this result is obtained due to the fact that these mainly consist of a socket having on its back face attaching means capable of removably engaging on guide means retaining the power supply leads along their entire length, power connecting means co-operating with the power supply circuits during their attachment, and the front face of said socket being provided with securing means retaining a logic block, first contact means for the connection of said power connecting means to the logic blocks, second contact means connecting the logic blocks to interconnect means located in an area close to the logic blocks and bein accessible from the front.

In a particularly interesting embodiment of the present invention the guide means consist of a metal rail of a generally U-shaped cross section, whose side walls are provided with internal projections for maintaining an insulating block, provided with grooves where the electric leads are embedded, and with external projections adapted to accommodate electro-mechanical devices.

Further details of the present invention are explained by way of example in the following description together with the following figures.

Figure 4:
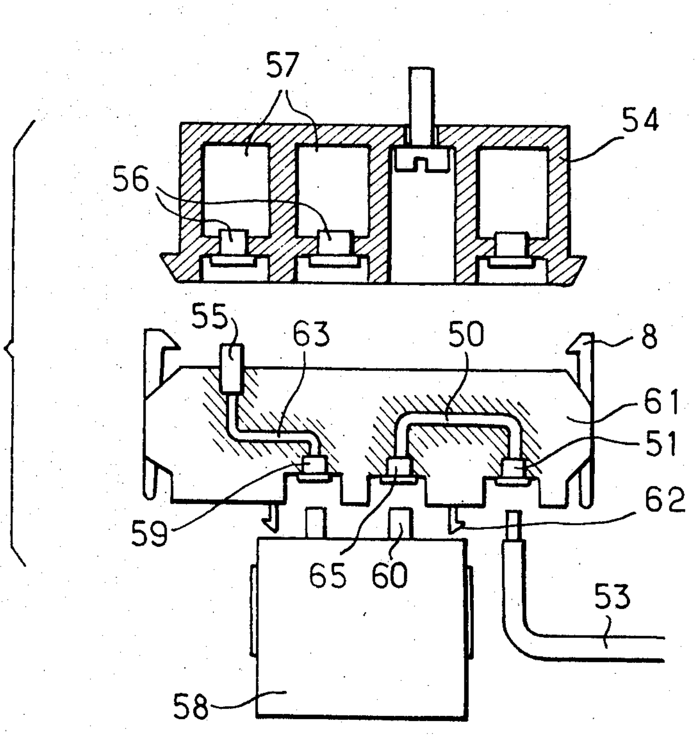

FIG. 4 principally illustrates an embodiment employing pneumatic logics.

First it is recalled that this invention relates to an interconnect and power supply system for logic blocks.

Figure 1:
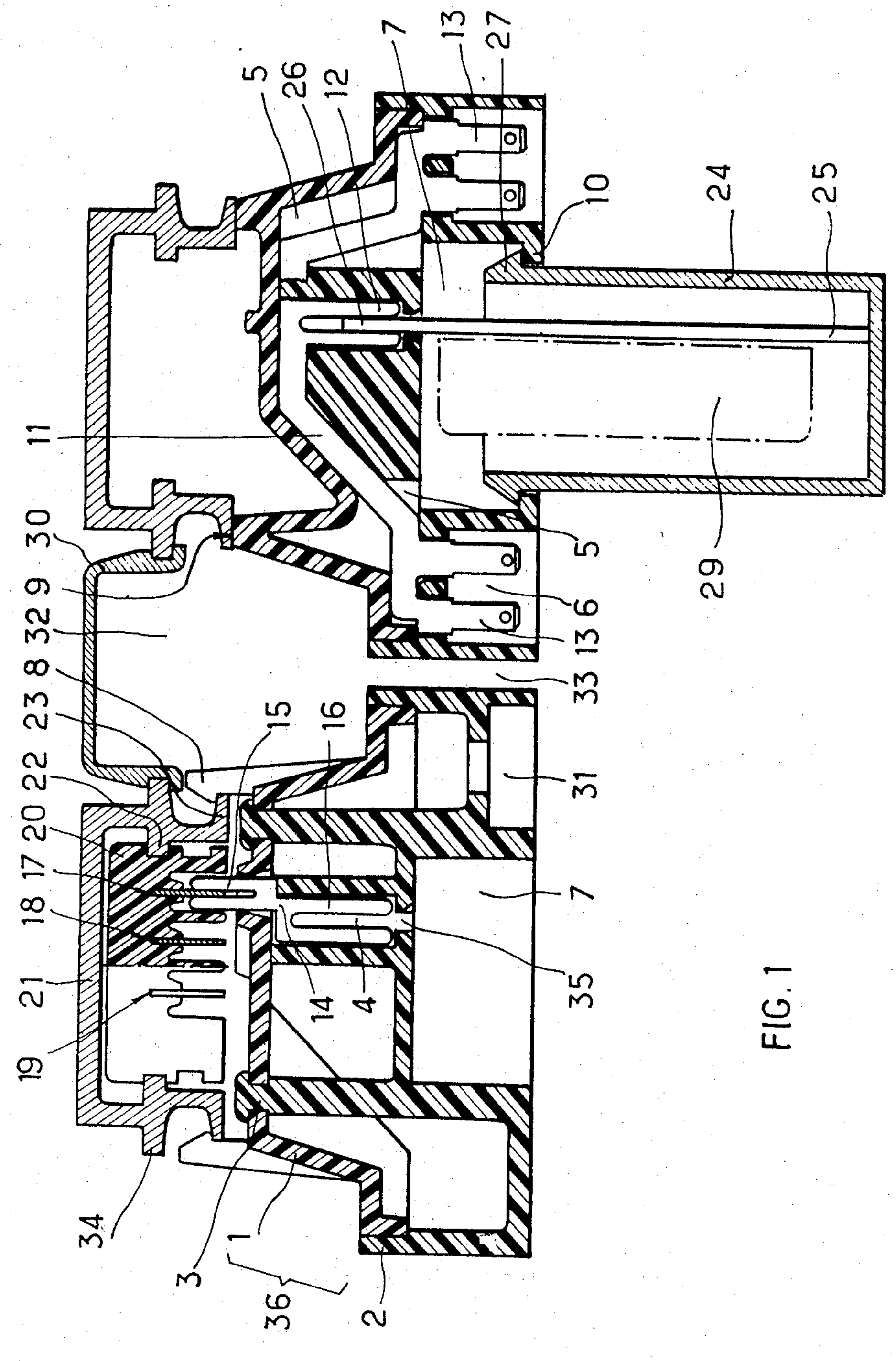
FIG. 1 shows an embodiment where the logic employs electronic circuits, this figure showing two neighbouring logic blocks, each of these blocks being represented in a different sectional view.

Referring to FIG. 1, power supply leads 17, 18, 19, can be seen which are made up of strips of a material of good electric conductivity.

These conducting strips are maintained in position by an insulating block 20 which is placed between the side walls of a metal rail 21 of U-shaped cross section, this rail having two internal ribs 22 at this level. The outer surface of the side walls of the rail 21 also comprises ribs 23, 34 respectively, whose function will be indicated below.

The elements forming the logic blocks are arranged on a printed circuit board 25, housed in an insulating casing 24. One end 26 of this printed circuit board 25 has conductor strips destined to receive the supply voltages, to provide the signals generated on the board 25 and to accept logic input signals from other logic blocks or detectors placed in the vicinity of the controlled equipment.

On the one hand, these logic blocks must be secured, and, on the other hand, they are to be connected to adjacent components or units. This function is provided by a support means essentially consisting of a socket of insulating material, this socket accommodating conductors such as leads 11 and 14 and being provided with means 8 for attaching and means 7 for lodging logic blocks.

Considering FIG. 1, the attaching means 8 consist of hooks 8 taking advantage of the elasticity of the insulating material of a back casing 1 of the socket of which they are part. When the socket 36 is engaged on the rail 21, the hooks 8 first spread sideways, then returning to engage on the ribs 23; at this moment the face 9 of the socket 36 is pressed against the front edge of rail 21, thus ensuring an attachment without play.

The back casing 1 of the socket is fixed onto a front casing 2 of the same socket by means of protruding lugs 3 for fastening, by example by thermoplastic deformation of their ends. When the two casings 1 and 2 are joined together, they define between each other a number of internal volumes or sub-cavities such as referred to by numerals 4 and 5, destined to accommodate the conductors mentioned before.

These conductors are divided into two categories according to their functions. The conductors 14 are provided with prongs 15 and 16 at their ends. The prongs 15, directed towards the back, are engaged on the conductor strips, while the prongs 16, directed towards the front are placed in front of a cavity 7 destined to house a logic block.

When a logic block is placed in the cavity 7, two rims 10 of the latter are gripped by two hooks 27, carried by the casing 24, and the end 26 of the printed circuit board 25 carrying the conductor strips is engaged in a slot 35 located at the back wall of the cavity 7, in order to plug into the prongs 16. The connection thus established provides power to logic block from the power supply leads.

Similarly, the conductors 11 are trapped between the two casings 1 and 2. However, their function is different and consists in bringing to the front the tensions present on the conductor strips of the end 26 of the printed circuit board.

At their ends, the conductors 11 present two different types of contact means: the end located in face of the slot 35 comprises elastic prongs 12, whereas the other end is provided with two flat pins or tags 13, turned towards the front and situated close to the cavity 7. In order to ensure good insulation, these pins 13 are lodged in openings 6, which are arranged on either side of the cavity 7.

The interconnecting system becomes most advantageous if a plurality of logic blocks is to be used. In this case several rails 21 with U-shaped cross sections are placed in parallel to one another on a board or at the back wall of a protecting cabinet.

The sockets 36, fastened to these rails 21 are wider than the latter so that a channel 32 is formed between two adjacent rows of sockets. By means of a cover 30, engaged on the ribs 34, a channel is provided which is only accessible through the opening 33 separating the widest parts of the sockets 36.

The existence of this channel 32 is taken advantage of in order to bundle the interconnecting leads from the pins 13 of neighbouring or separated logic blocks, thus permitting to keep the front surface clear of a layer of interconnecting wires which could hamper gripping of the removable logic blocks. This latter operation is moreover facilitated by the fact that the width of one logic block is smaller than the width of the socket 36. Introduction and removal of logic blocks is performed by squeezing the side walls of the housing 24, by which means the hooks 27 are released.

Moreover, the socket comprises a cutout 31 destined to receive a label allowing to associate it with a corresponding logic block.

Furthermore, the rail 21 with its U-shaped cross section has been chosen so that its shape and the dimensions of its external ribs 23 correspond to those of a standard profile. It thus becomes possible to fasten to the rail 21 relay supports or terminal blocks as necessitated by the desired circuitry and by the required connections with the exterior.

The front surface of these rails 21 can be covered by a protecting plate in those areas where neither sockets 36 nor ancillary components are fastened, or, alternately, it can be provided with means to connect the supply voltages to the neighbouring rails 21.

The embodiment thus described owes its advantages to the specific arrangement of its connecting means, it remains also of interest in systems where informations are transmitted and processed by optical or pneumatic means.

Figure 2:
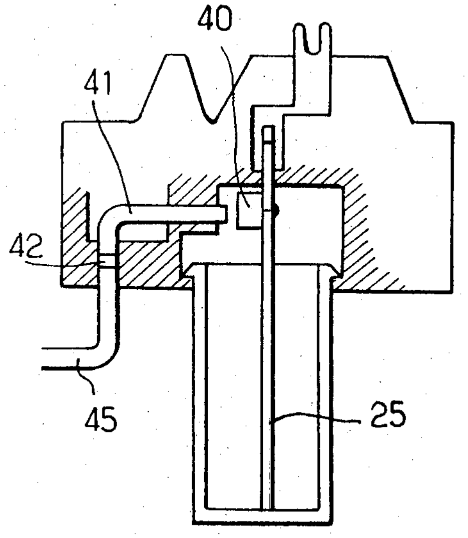
FIG. 2 shows an embodiment where electro-optical components are employed.

FIG. 2 illustrates an embodiment according to the present invention where informations are coupled from one logic block to the next by optical means. In this case, the light signal generated by one component 40, fastened to the printed circuit board 25, is transferred to the front side by a convenient light conductor means 41. A circular aperture 42 in the socket 36 allows to introduce and to secure an interconnecting light conductor 45, whose other end is terminated at the next logic block concerned. Of course, this latter block is provided with a component capable to process the light arriving along a path comparable to that followed along light conductor means 41.

Figure 3:
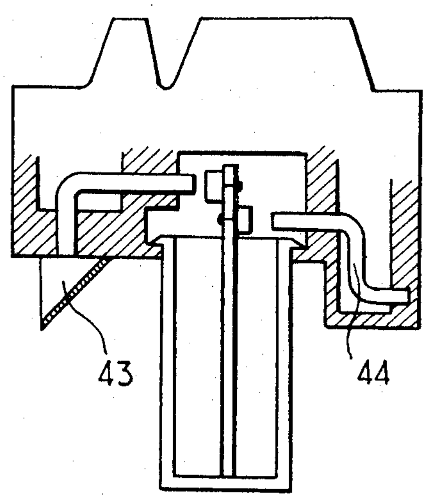
FIG. 3 shows a modification of the embodiment shown in FIG. 2.

According to the embodiment shown in FIG. 3, the socket 36 can comprise on its front end, light reflectors 43 and/or bent light conductors 44 which can cooperate with equivalent means provided on a neighbouring logic block.

FIG. 4 represents another embodiment of the present invention adapted for those cases where pneumatic logic blocks are employed.

The particular nature of the problem has to be taken into account for the arrangement of the necessary connecting means for the supply of fluid and for the transfer of information.

Consequently, the fact of not connecting a connecting means must not lead to the leakage of fluid.

Thus, the joints 56 placed on a supply tube 57 in order to co-operate with fluid supply connecting means 55, the joints 59 and 65 arranged on the socket in order to co-operate with connecting terminals 60 of a logic block 58 and the interconnecting means 51, also situated on the socket 58 in order to co-operate with interconnect manifolds 53 either have a shape adapted to receive plugs, or are equipped with devices, such as valves, preventing leakage of fluid when used.

Internal channels 63, 50, provided in the socket connect the fluid supply connecting means and the interconnecting means to the terminals. The logic block is maintained in position by hooks 62 or any similar device located on the socket.

On FIG. 4 fluid supply channels 57 are formed inside the block 54 by way of extrusion, they can also be arranged as individual tubes on said block which replaces the rail 21 previously mentioned.

We claim:

1. Coupling and supporting means for logic blocks having first and second connecting means, said supporting means providing power supply connections to said blocks and interconnections between said blocks, said supporting means comprising:

elongated means (21) of U-shaped cross-section having side walls fitted with first clamping means (23, 24) and having power supply leads (17, 18, 19) fitted in its internal part;

a plurality of sockets (36) respectively associated with said logic blocks, each socket having side walls, a back surface provided with second clamping means (8) capable of removably engaging with said first clamping means and a front surface, exhibiting a main cavity for receiving at least a portion of a logic block, said front surface being provided with securing means (10) for retaining said block;

first contact means (14) in said socket having a first extremity (15) in which said supply leads engages, and a second extremity (16) in which said first connecting means of said block engages;

second contact means (11) having a first extremity (12) in which said second connecting means of said blocks engages, and a second extremity (13) located at said front surface of the socket, in the proximity of said main cavity and of one of said socket side walls, the various blocks being intercoupled by intercoupling said second extremities of said second means of the sockets respectively associated to said various blocks.

2. Support means according to claim 1, wherein said elongated means is built up by a metal rail, the internal faces of said side walls of said elongated means comprising ribs 22, and wherein an insulating block is placed within said elongated means, comprising grooves for said power supply leads and recesses, said ribs fitting into said recesses.

3. Support means according to claim 1, wherein each socket is built up by a first and a second insulating casings cooperating with each other, said first casing comprising said back surface and said second clamping means cooperating with said first clamping means on said rail, said second casing comprising said front surface and said main cavity for the logic block, both casings further comprising sub-cavities communicating with said main cavity for receiving said first and second contact means.

4. Supporting means according to claim 3, wherein said second extremity of said first contact means is placed in a sub-cavity open towards the main cavity and is prong-shaped, the prong being open towards the main cavity, said first connecting means of said blocks terminating in said sub-cavity between the arms of said prong, said first extremity of said first contact means traversing said back surface, and wherein said first extremity of said second contact means is placed in a sub-cavity open towards said main cavity and is prong-shaped, the prong being open towards the main cavity.

* * * * *